Dec. 10, 1963   W. B. SMITH   3,113,679
ORNAMENTAL FIXTURE
Filed June 27, 1960   8 Sheets-Sheet 3
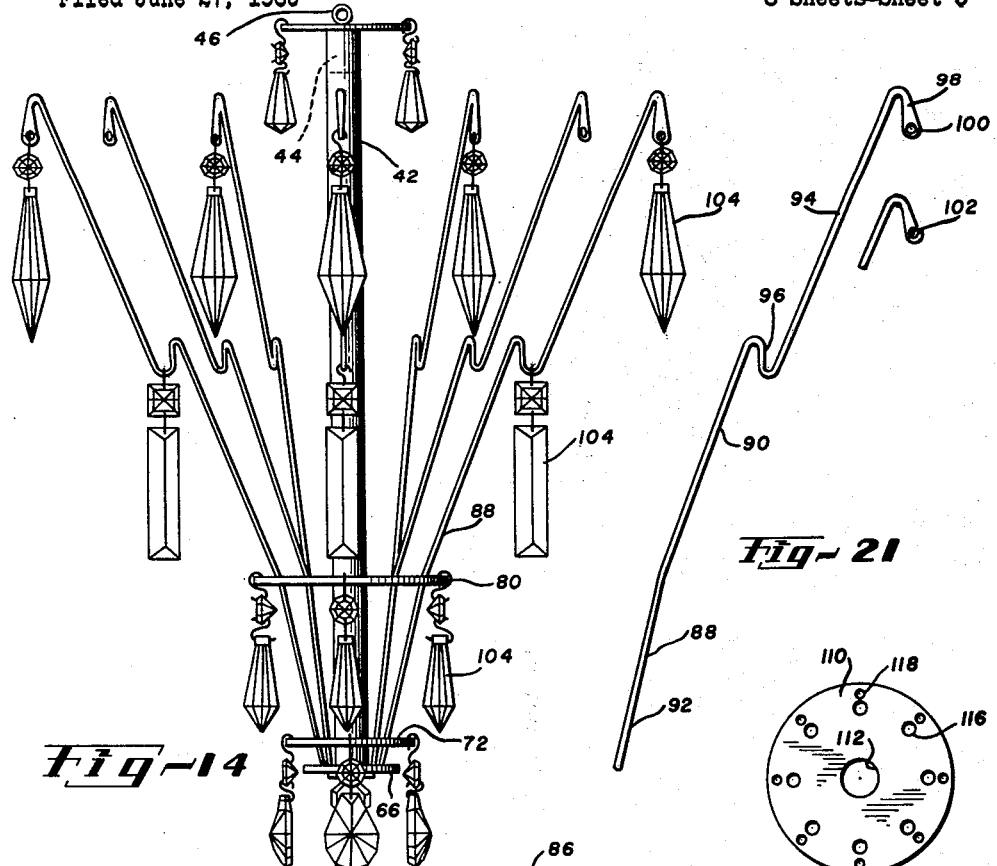
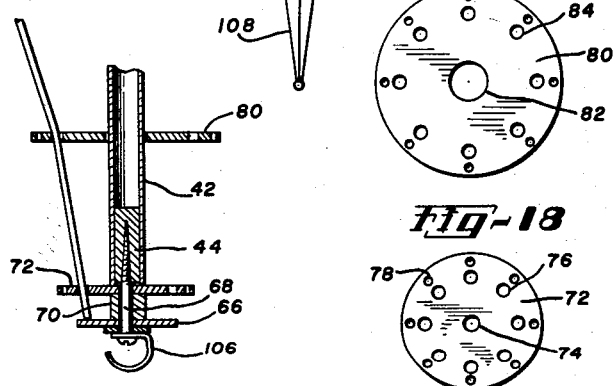
INVENTOR.
WILLIAM B. SMITH
ATTORNEYS

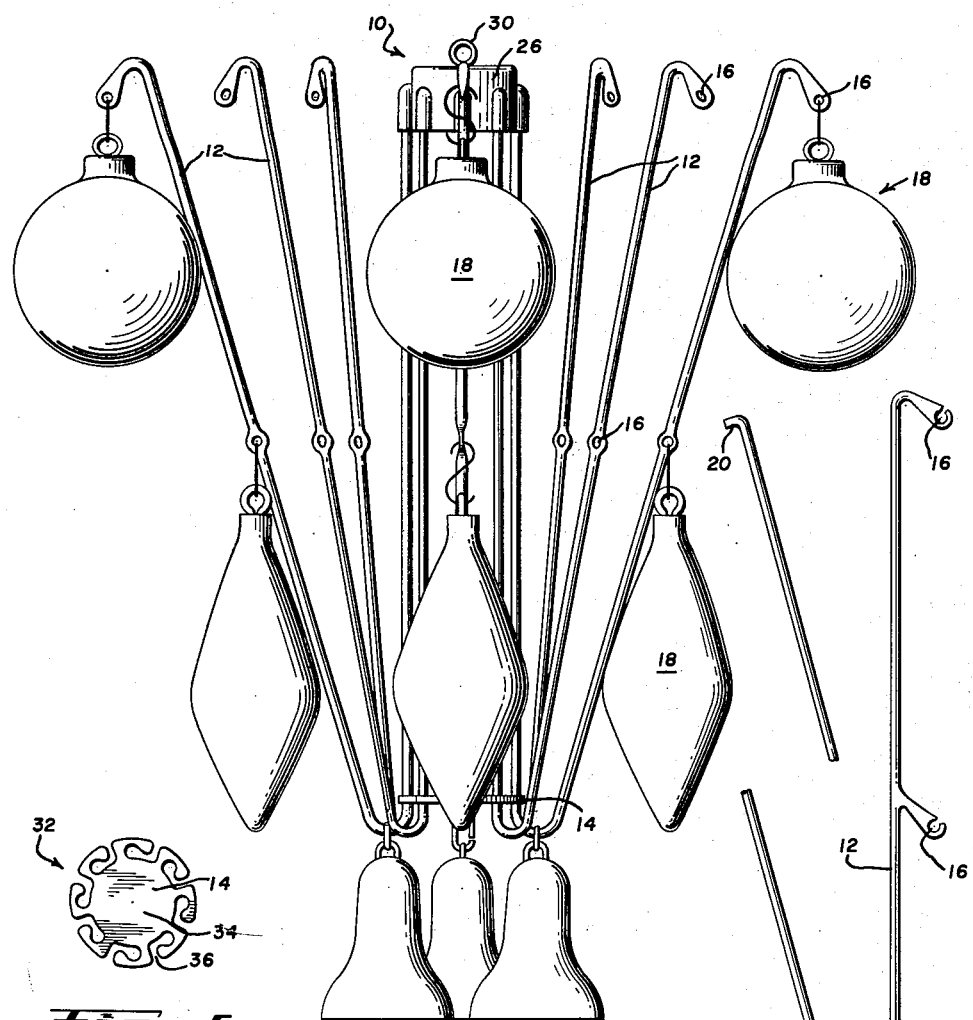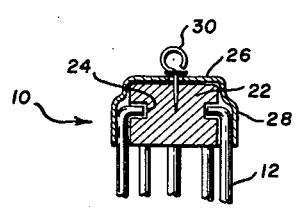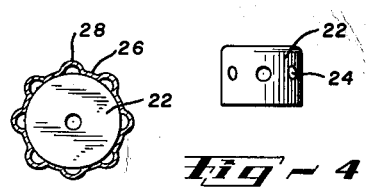

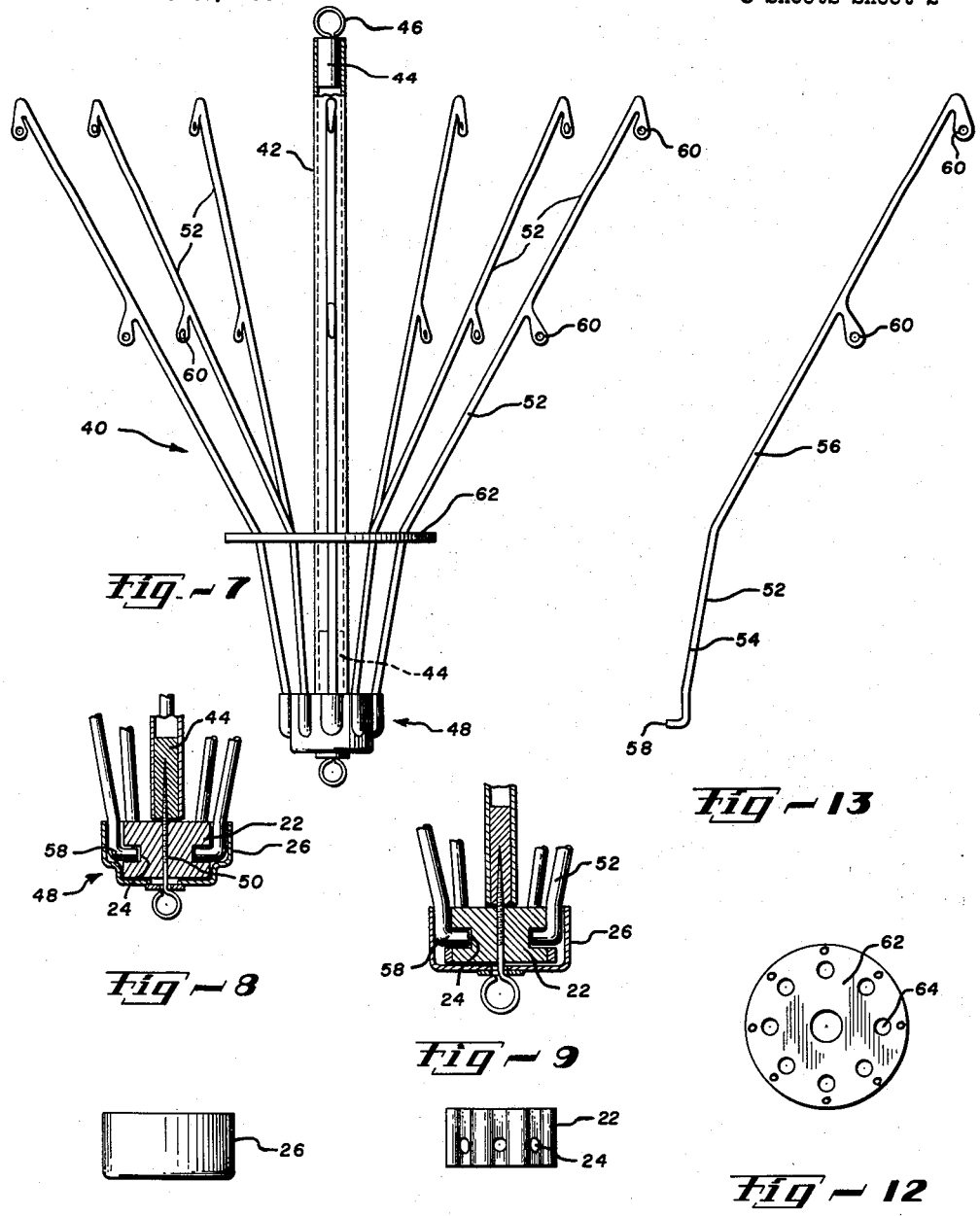

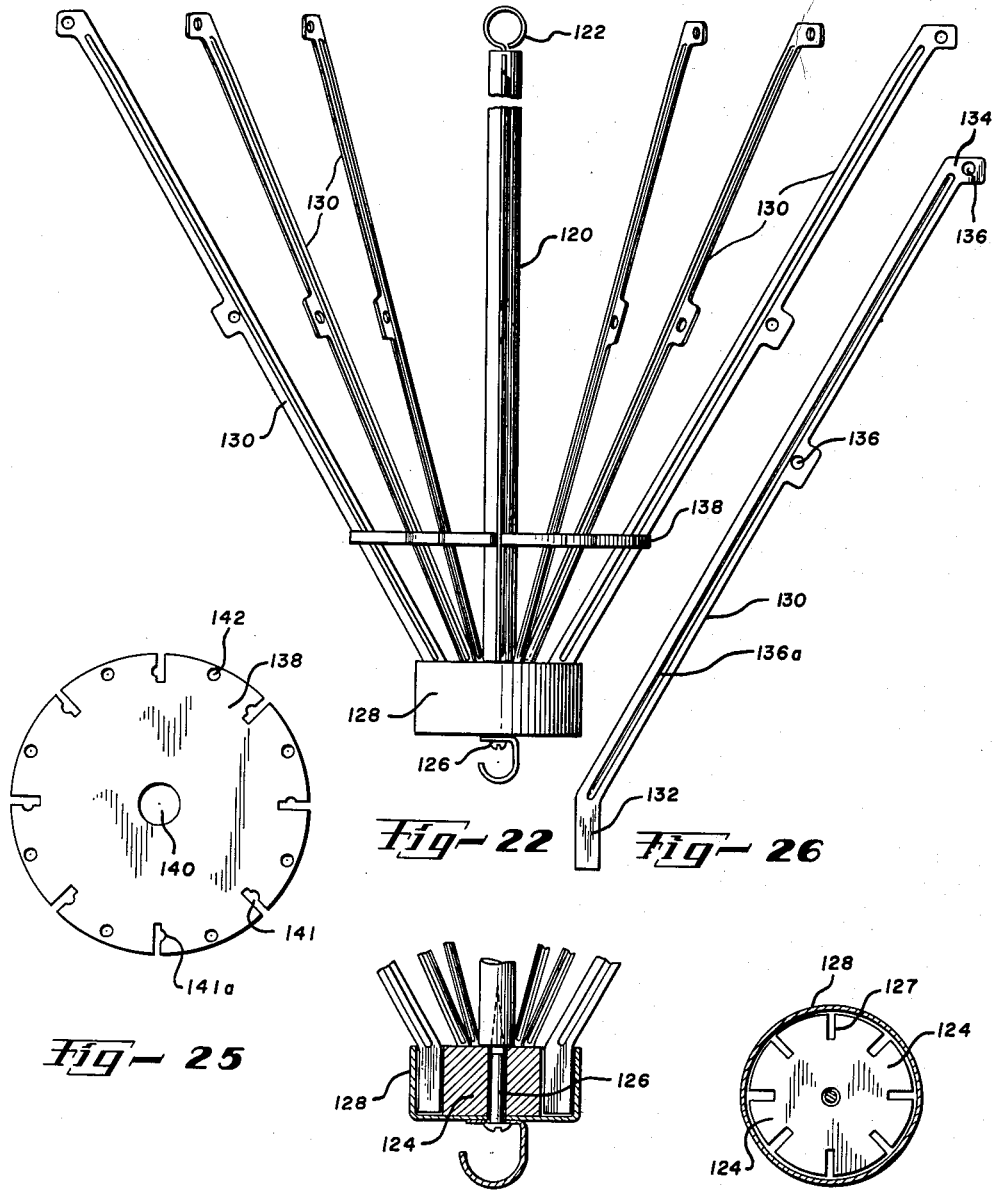

Dec. 10, 1963  W. B. SMITH  3,113,679
ORNAMENTAL FIXTURE
Filed June 27, 1960  8 Sheets-Sheet 5
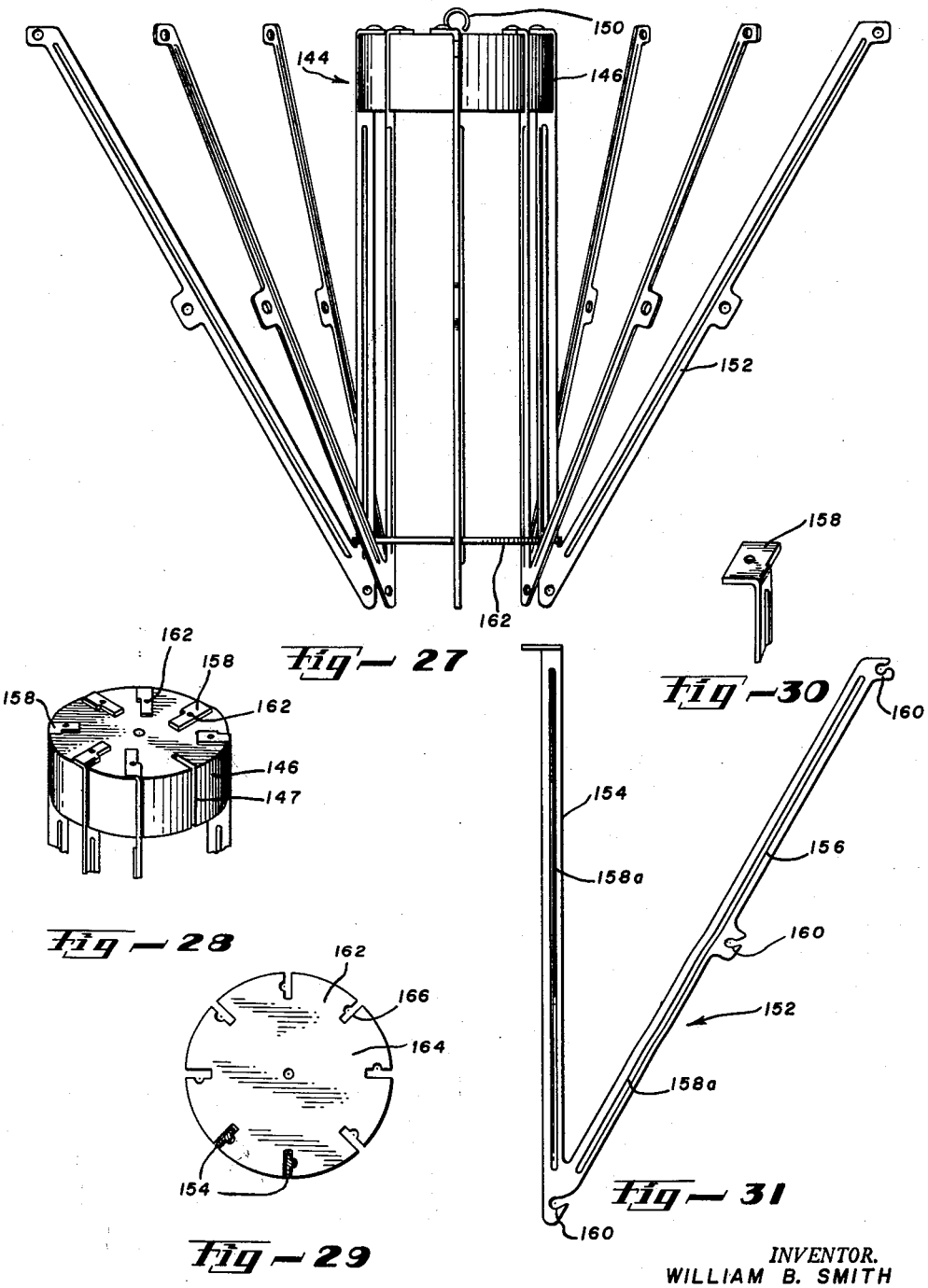
INVENTOR.
WILLIAM B. SMITH
BY
ATTORNEYS

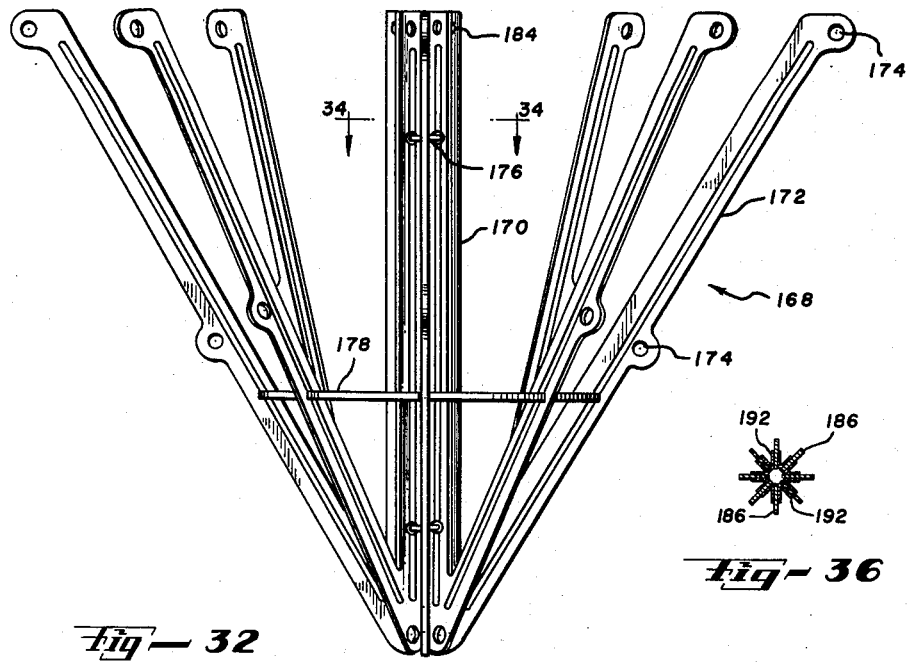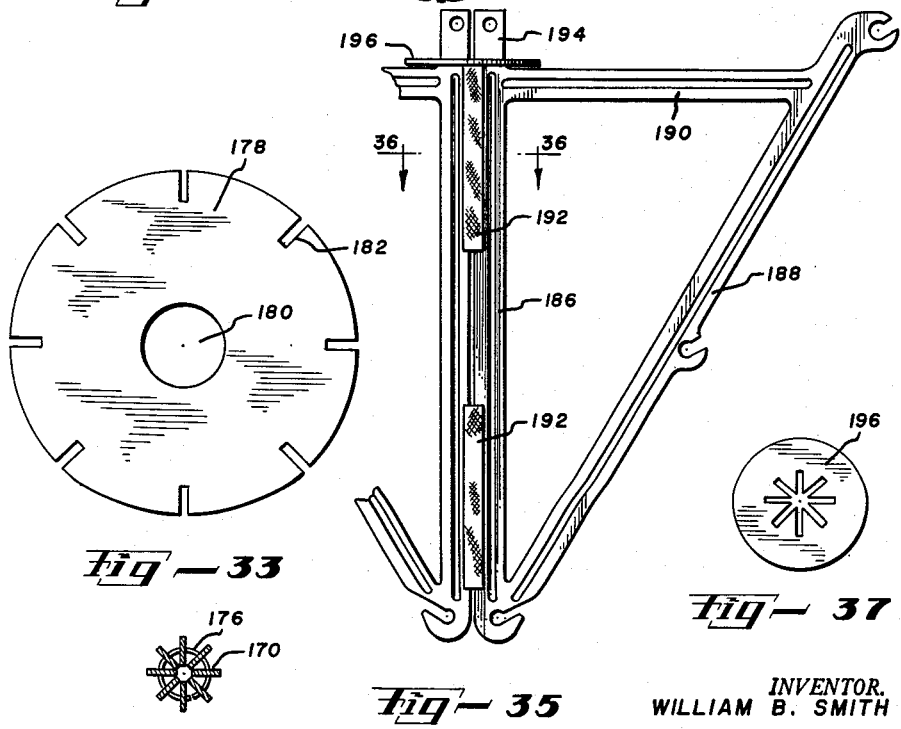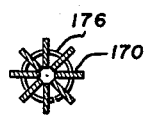

Dec. 10, 1963 W. B. SMITH 3,113,679
ORNAMENTAL FIXTURE
Filed June 27, 1960 8 Sheets-Sheet 7
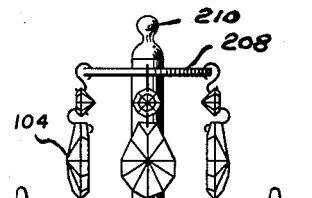
Fig-38
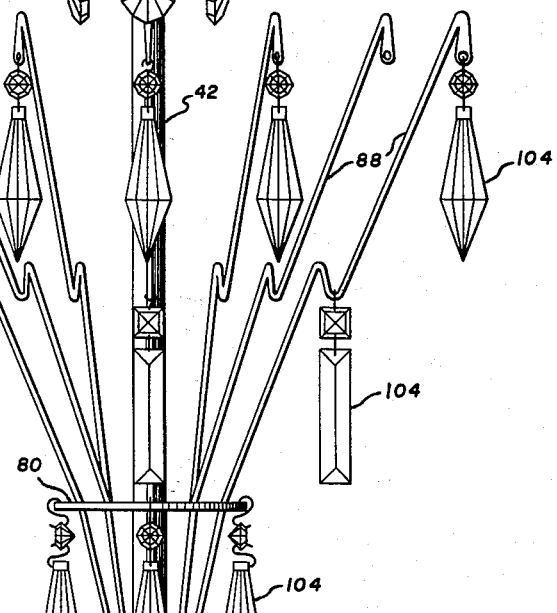
Fig-39
Fig-40
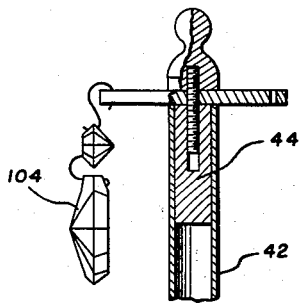
INVENTOR.
WILLIAM B. SMITH
BY Pattison, Wright & Pattison
ATTORNEYS

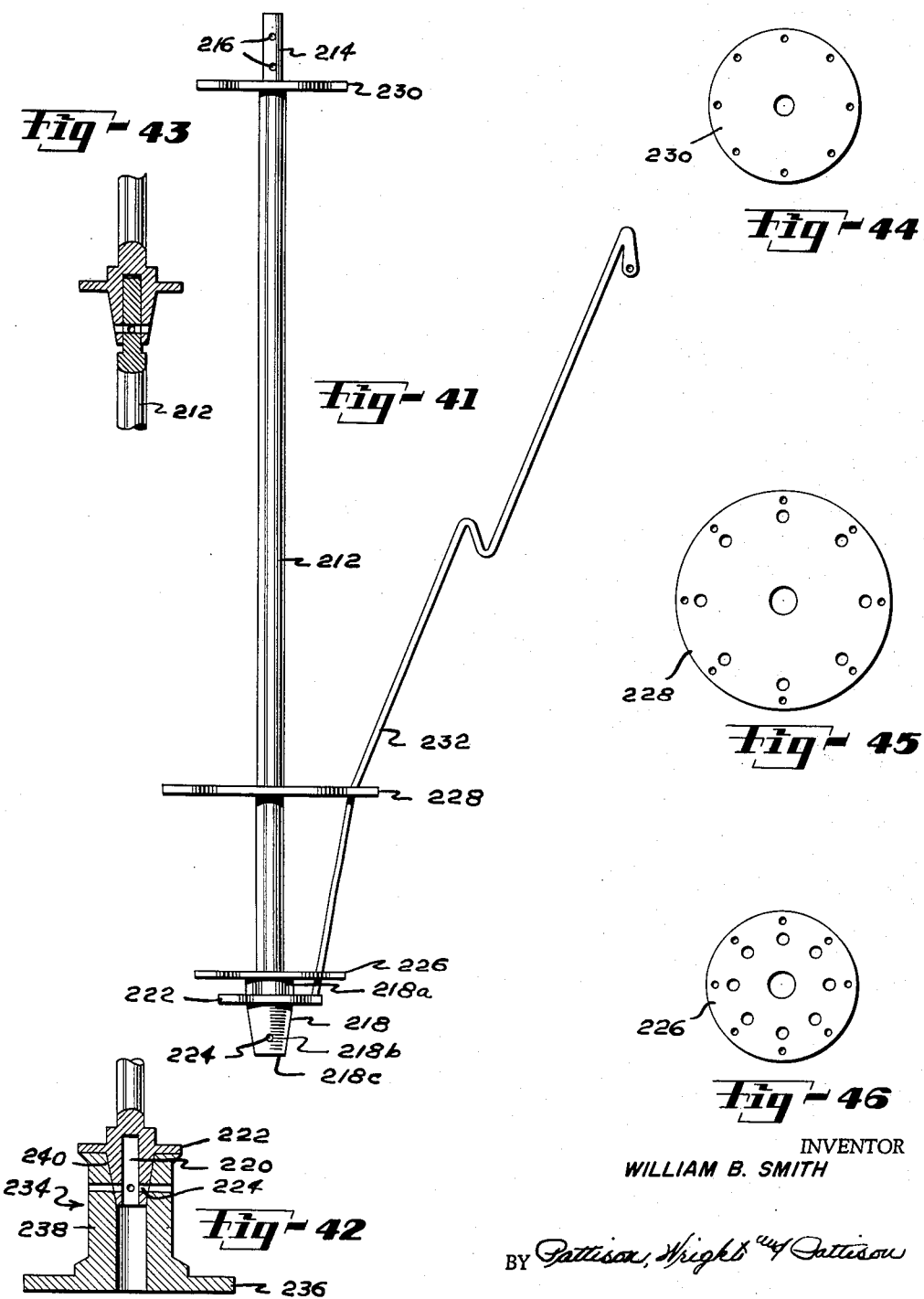

United States Patent Office 3,113,679
Patented Dec. 10, 1963

3,113,679
ORNAMENTAL FIXTURE
William B. Smith, Wheaton, Md.
(2413 Dennis Ave., Silver Spring, Md.)
Filed June 27, 1960, Ser. No. 39,004
13 Claims. (Cl. 211—118)

This invention relates to an ornamental fixture and more particularly and specifically to a knock-down or collapsible decorative or display fixture for both commercial and home use.

It is a principal object of this invention to provide a readily collapsible and erectable decorative fixture for use in commercial display and home ornamentation.

A general object of this invention resides in the provision of a new and useful skeletal type fixture which is highly versatile in its adaption to supporting display or ornamental articles in a symmetrical, aesthetically pleasing manner and arrangement.

Another object of this invention resides in the provision of a useful display and ornament support which is quickly, easily and positively erected into a rigid, durable structure from a knock-down or collapsed condition.

Still another object of the present invention lies in the provision of a novel and useful fixture for display and ornamentation which is of extremely simple and inexpensive design and manufacture yet which is sturdy and durable over extended periods of use.

Still further objects and advantages of the present invention will become more readily apparent to those skilled in the art when the following description is read in the light of the appended drawings.

The nature of the present invention may be stated in general terms as comprising a knock-down or collapsible fixture for display and ornamentation purposes which includes a central body portion adapted for suspension from a fixed terminus, a plurality of elongated arms removably supported on the body and projecting obliquely therefrom in a radial pattern, spacer means detachably engaging and rigidly indexing said arms independently of said body portion, and means at spaced points along each arm for engaging and supporting display and ornamental articles.

Referring now to the accompanying drawings in which like numerals designate similar and equivalent parts throughout the several views:

FIG. 1 is a side elevation of one form of the fixture with ornamentation applied.

FIG. 2 is a fragmentary vertical section through the supporting body component of the fixture.

FIG. 3 is a bottom plan view of the body component.

FIG. 4 is a side elevation of the plug portion of the body component.

FIG. 5 is a plan view of the indexing spacer member.

FIG. 6 is an elevation of a modified form of the arm element of the fixture.

FIG. 7 is a view similar to FIG. 1 of a modified form of the fixture.

FIG. 8 is a vertical section of the lower end portion of the body component of the fixture of FIG. 7.

FIG. 9 is a vertical section similar to FIG. 8 of a modified form of the lower body portion of the fixture.

FIG. 10 is an elevational view of the plug component of the structure of FIG. 9.

FIG. 11 is an elevational view of the cap component of FIG. 9.

FIG. 12 is a plan view of the indexing spacer of FIG. 7.

FIG. 13 is an elevation of an arm component of the fixture of FIG. 7.

FIG. 14 is a view similar to FIGS. 1 and 7 of another modified form of the fixture.

FIG. 15 is a vertical section of the lower end of the body component of the fixture of FIG. 14.

FIG. 16 is a plan view of the arm support and stop disc of the fixture of FIG. 14.

FIG. 17 is a plan view of the lower indexing spacer of the fixture of FIG. 14.

FIG. 18 is a plan view of the upper indexing spacer of the fixture of FIG. 14.

FIG. 19 is a view similar to FIG. 15 of a modified form of the lower portion of the body component.

FIG. 20 is a plan view of the elements of FIG. 19.

FIG. 21 is an elevation of an arm member of the fixture of FIG. 14 with exploded modifications of the article engaging elements of that arm.

FIG. 22 is a view similar to FIGS. 1, 7 and 14 of another modified form of the fixture.

FIG. 23 is a vertical section of the lower portion of the body component of the fixture of FIG. 22.

FIG. 24 is a plan view of the lower body portion of the fixture of FIG. 22.

FIG. 25 is a plan view of the indexing spacer of the fixture of FIG. 22.

FIG. 26 is an elevation of one of the arm elements of the fixture of FIG. 22.

FIG. 27 is a view similar to FIG. 1 of still another modified form of the fixture.

FIG. 28 is a pictorial view of the upper body portion of the fixture of FIG. 27.

FIG. 29 is a plan view of the base index spacer of FIG. 27.

FIG. 30 is a perspective view of the attaching element of one extremity of each of the arm elements of FIG. 27.

FIG. 31 is an elevational view of a modified form of the arm element of the fixture of FIG. 27.

FIG. 32 is a view similar to FIG. 1 of a further modification of the fixture.

FIG. 33 is a plan view of the indexing spacer of the fixture of FIG. 32.

FIG. 34 is a horizontal sectional view taken on line 34—34, FIG. 32.

FIG. 35 is a view similar to FIG. 32 of still another modified form of the fixture.

FIG. 36 is a horizontal section taken on line 36—36, FIG. 35.

FIG. 37 is a plan view of the indexing spacer of the fixture of FIG. 35.

FIG. 38 is a view similar to FIG. 1 of another modified form of the invention.

FIG. 39 is a fragmentary section of the crown portion of FIG. 38.

FIG. 40 is a fragmentary section of the base portion of FIG. 38.

FIG. 41 is an elevation of still another modified form.

FIG. 42 is a fragmentary section of the fixture of FIG. 41.

FIG. 43 is another fragmentary section of the fixture of FIG. 41.

FIGS. 44 through 46 are plan views of components associated with the modified form of FIG. 41.

It is fully contemplated that the Christmas and pendent ornaments shown may be replaced with commercial display merchandise or other articles desired to be symmetrically suspended for any functional or decorative purpose. It is not my intention that the uses or the structure of my inventive concepts be limited beyond the prior art requirements and broad interpretation of the appended claims.

Referring now to FIGS. 1–6 of the drawings, there is shown an embodiment of my ornamental fixture utilized as a Christmas decoration. In this embodiment my fixture consists of a central body element, generally designated at 10, a plurality of angular arm members 12 detachably connected to the body element 10, an indexing and spacing element 14 detachably engaging and rigidly retaining the arms in fixed spaced relationship to one another, and hook or eye formations 16 at spaced points along each arm from which Christmas ornaments, generally designated 18, are suspended.

In the details shown it is seen that the arms 12 are identically formed each in a generally V-shaped loop, one leg of which, in assembly, is vertically disposed with the other leg projecting outwardly and upwardly divergently from the first and from the looped juncture of the two. The extremity of the normally vertical leg of each arm is provided with a right angularly extending stub 20 projecting away from the angular leg of the arm component. The angular leg of the arm component is provided on its extremity and at selected points therealong with eye loop or hook formations 16, FIGS. 1 and 6 respectively.

The body portion or element 10 consists of a solid block member 22, FIGS. 2 and 4, of cylindrical configuration and provided with spaced radially opening recesses 24 in the outer surface thereof, each adapted to receive a stub 20 of one of the arms 12 to suspend the vertical section of an arm therefrom. A fluted, cup-like cap member 26 having upset channels 28 formed inwardly from the open mouth of the cup along the wall thereof in radially spaced arrangement thereabout is telescoped in inverted condition downwardly over the block with each channel 28 registering with and telescopically receiving and overlying one of the positioned arm members 12 locking the stub portion of each arm in engagement in its respective block recess. A screw eye 30, or the like, is inserted through a central opening in the top wall of the inverted cup and threadedly engaged centrally into the block 22 to interlock the block and cap in their respective telescoped positions.

When arm members 12 are secured in each recess of the block and locked in place by the cap element, the vertical portions of the looped arms define a centrally depending tubular column beneath the cap, and the angular portions of the arms project outwardly and upwardly in a generally radial pattern oblique to the column from the bottom end thereof. An indexing and spacing disc 32, as seen in FIG. 5, is provided which consists of a circular plate 34 having, at radial points about the circumferential edge thereof, offset channels 36, opening radially inwardly of the disc and then being angularly offset in a circumferentially concentric direction for a spaced distance, each in the same direction around said disc.

The indexing disc 34 is positioned within the lower end of the column defined by the depending vertical portions of the arms, and the offset channels 36 of the disc are brought into registry one with each of the vertically depending arm portions which are moved inwardly of the channel and which are locked into the angularly extending portion thereof. By this arrangement the indexing spacer 32 is rigidly interlocked with the arm members to retain them in indexed, fixed relationship one with the other. The foregoing completes the assembly of the fixture which is suspended by means of the screw eye 30 from a fixed overhead terminus and, thereafter, ornaments or other articles may be secured to and suspended from the formations 16 along the length of each of the angularly projecting arm members of the fixture.

The modified fixture, generally designated 40, as is shown in FIGS. 7-13, consists of a body portion formed by an elongated tube 42, of plastic, metal or the like, each end of which is closed by a plug element 44 which is threaded, swaged or otherwise firmly secured in the tube. The upper end of the tube is provided with a screw eye 46 secured in the upper plug 44 and projecting vertically thereabove. Screw eye 46 permits the tube to be suspended from a fixed overhead support.

A body component generally designated 48 is positioned centrally beneath the lower end of the tube. This body component is substantially identical to that generally designated 10 and described in conjunction with the fixture of FIG. 1. However, as is best seen in FIG. 8, the block element 22 of the body component and the covering cap 26 are inverted and an elongated screw eye 50 is threadedly secured centrally and upwardly through the cap and plug to engage axially in the plug 44 in the lower end of the tube 42 thereby retaining the body component against the bottom of the tube.

Associated with the tube and body portion of the fixture of FIG. 7 is a plurality of arm elements 52 each of which consists of a short portion 54 adjacent one end and an extended portion 56 through the second end which projects at an angle to the axis of the short portion 54. The extreme end of the arm portion 54 is provided with an angular stub 58 for telescopic reception in a radial recess 24 in the block portion of the bottom component to position the angular portion 56 of the arm in upwardly and outwardly projecting oblique relationship to the axis of the tube. The extended arm portion 56 is provided along its length and on its extremity with eye formations 60 similar to those at 16 earlier described.

To complete the assembly of the fixture of FIG. 7, an indexing spacer 62, FIG. 12, is positioned in engagement with each of the arm elements 52 to space and retain the arms in fixed relationship. The indexing spacer consists of a flat, round disc having a plurality of holes 64 therethrough arranged in a circular pattern therein, the circular pattern being concentrically within the circumference of the disc and the holes defining the pattern being equally spaced about the disc.

In FIGS. 9, 10 and 11 there is shown a modified form of the lower body component of the fixture of FIG. 7. In this modification the block element 22 is substantially identical to that previously described except that it is fluted from each radial recess vertically through the upper face in such a manner that those portions of the arm elements adjacent the stub section thereof inserted in each radial recess registers with and lies within the groove or flute extending from that recess vertically. The retaining cap 26 has flush side walls, as distinguished from the fluted walls of the cap previously described, which telescopically overlie the arm portions along the circumference of the plug and lock the arms in engagement with the block.

The modified fixture of FIG. 14 is similar to that of FIG. 7 in that an elongated tube 42 having end plugs 44 is suspended from an overhead fixed support by a screw eye 46 secured in the plug at the upper end of the tube. A solid circular support disc 66 is secured centrally beneath the lower end of the tube by a screw 68 which vertically penetrates the disc and engages in the plug 44 at the lower end of the tube. The screw 68 carries immediately above the disc 66 a tubular spacer element 70 upon the upper surface of which is supported concentrically about the screw a first indexing disc 72, FIG. 17. This first indexing disc is a flat circular plate having a central aperture 74 for the reception of the screw 68, a circular pattern of radially spaced openings 76 concentrically within the circumference of the disc, and a second circular pattern of smaller holes 78 concentrically between the first pattern of holes and the circumference of the disc with each hole 78 being positioned on the radial line of a hole 76 in the inner pattern The upper face of the disc concentrically about the screw is retained in abutment with the lower end of the tube 42.

A second spacer element 80, FIG. 18, is provided for the fixture which consists of a flat disc or plate circular in shape and having a center aperture 82 of a substantially identical diameter to that of the tube 42 about which it is tightly telescopically positioned at a point elevated above the lower end of the tube This second disc is provided, similarly to the first disc 72, with a first series of radially spaced circumferentially arranged holes 84 and a second series of smaller radially spaced circumferentially arranged holes 86 outwardly in a radial direction one from each of the holes of the first series.

A plurality of arm members 88 is provided in conjunction with the first series of disc holes and each arm, FIG. 21, consists of a rod-like element having three principal sections from end to end, the center section 90 extending at a slight angle to the axis of a straight section 92 adjacent one end and being joined to the third section 94 at the second end by an angular loop 96 formed integrally in the arm so that the section 94 lies substantially in parallel to the center section 90 but offset therefrom by reason of the loop 96. The extremity of the end section 94 is turned over as at 98 and is provided with an eye formation 100 in the turned-over portion which can assume a hook-like configuration such as is shown as 102 in the alternate explosion of the end configuration in FIG. 21.

In assembly of the fixture of FIG. 14 the straight end section 92 of each arm is inserted first through a hole 84 in the second and uppermost indexing spacer 80 downwardly through a corresponding hole 76 in the lower indexing spacer 72 to bring the extreme end into abutment upon the upper surface of the supporting or stop disc 66 immediately below the first, lower indexing spacer. The positioning of the upper indexing spacer is such that it will engage the arm at the integral juncture of the sections 92 and 90 of the arm so that sections 90 and 94 of the arm project upwardly and outwardly from the spacer at an oblique angle to the axis of the tube to permit the suspension of pendants 104 or the like from the hoop 96 of the arm and from the eye formation 100 in the upper outermost extremity of the end section 94 of the arm. The provision of the smaller holes 78 and 96 in the lower and upper spacer discs, respectively, permit the suspension of additional pendant elements 104 from these discs to provide further ornamentation, and an eye loop 106 may be secured to the underside of the support disc 66 from the screw 68 to suspend a central pendant 108 from beneath the fixture.

In FIGS. 19 and 20 there are illustrated modified forms of the support and indexing members for the fixture of FIG. 14 wherein the support or stop disc 66 and the lower indexing member 72 of that fixture are replaced by a cylindrical block 110 which is secured to the bottom of the tube which is recessed telescopically into a central circular depression 112 in the upper face of the block and secured therein by an extended screw 114 engaging in the plug 44 in the lower end of the tube. The upper face of the block 110 is provided with a series of recesses 116 arranged concentrically thereabout and radially spaced equally from one another. The recesses 116 are drilled or otherwise formed for a spaced distance downwardly of the plug to permit the reception therein of the lower end sections 92 of the arms 88 of the fixture to securely engage and anchor the lower ends of the arms and retain them in conjunction with the upper spacer disc 80, in the position previously described. The upper face of the block 110 is further provided with a concentrically arranged series of radially spaced recesses 118 outwardly from the recesses 116 which receive supporting hooks or the like for pendants or other ornamentation to be suspended therefrom.

In the modification of the fixture disclosed in FIGS. 22 through 25 a vertically disposed post 120 is provided with a screw eye 122 in its upper end to permit its suspension from an overhead support and a cylindrical block 124 is secured centrally beneath the post by means of a screw 126 engaged axially through the block into the lower end of the post. The block 124, FIG. 24, is provided about its circumference at equally spaced points with radially opening channels 127 extending inwardly thereof for a spaced distance. A retaining cup 128 having an inside diameter slightly greater than the outside diameter of the block 124 is telescoped upwardly about the block and is retained in place by the screw 126, the side walls of the cup extending continguously with the side walls of the block.

A plurality of arms 130, FIG. 26, is provided in association with the fixture, each arm consisting of an elongated flat bar having a short angularly extending stub 132 at one end and a shorter angularly extending stub 134 at the second end provided with an eye formation 136 therein. Additional eye formations 136 are provided along the length of the arm at spaced points. Further, each arm is provided with an upset strengthening rib 136a along the length of the straight portion thereof. In assembly, each arm is positioned in upwardly and outwardly projecting relationship from the block 124 and the longer angular stub section 132 thereof is positioned vertically above and moved downwardly into engagement in one of the radial passages 127 in the block to anchor the arm within the block and cup assembly so that it extends in fixed relationship obliquely to the axis of the post 120. When an arm has been secured in each passage 127 to provide a symmetrical pattern of obliquely and radially extending arms an indexing spacer element 138 is positioned at a spaced point above the block and cup assembly in a manner to rigidly engage and fix the spaced relationship of the arms on to the other. The spacer element 138 consists of a flat plate having a central opening 140 of substantially identical configuration to that of the post 120 about which it is telescopically positioned at a spaced point above the block and cup assembly. The circumferential edge of the plate is provided at equally spaced points thereabout with slotted passages 141 opening radially thereinto for a spaced distance, such passages being of a configuration so as to slidably receive therein the arms 130 at points above the lower end of the tube and to provide in each passage a detent 141a engaging the rib 136a of the arm. The spacer disc is additionally provided inwardly of its circumference with a circumferential pattern of holes 142 for the reception of hooks or like suspending elements for ornamentation to be supported by the circumferential edge of the plate.

The modified fixture element of FIG. 27 consists of a body portion, generally designated at 144, formed by a cylindrical block 146 which is provided about its circumference and for its full depth with a series of equally spaced slots 147 opening radially into the block for a spaced distance each having a detent 147a opening therefrom. The block is also provided centrally of its upper face with a screw eye 150 for suspending it from an overhead fixed support. Associated with the body block is a plurality of arm elements generally designated 152, FIG. 31, each of which consists of a normally vertically disposed flat elongated section 154 and an angularly extending section 156 formed integrally with the first section and defining therewith an acute angle. The upper extreme end of the straight section 154 of the arm is provided with an offset flange portion 158 perpendicular to that section and the extended flat portions with upset strengthening ribs 158a. The angularly projecting section 156 is provided at its extreme end, and at spaced points therealong, with hook formations 160 for reception of suspension hooks or the like for ornamentation.

In assembly, the upper end of the straight section 154 of each arm is radially, telescopically received within one of the circumferential slots 147 in the block with the flange 158 lying flush against the upper face of the block and overlying the upper face of the block to suspend the arm from the block. Fastening means 162 may be utilized downwardly through the flange portion 158 into the upper face of the block to lock each arm in place in the block. By the foregoing arrangement a tubular column is defined vertically beneath the block by the straight sections 154 or plural arms suspended from the block. An indexing spacer 164, FIG. 29, consisting of a circular plate of substantially an identical diameter to the cylindrical block 146 and having radially opening slots 166 about the circumference thereof coinciding with those in the cylindrical block is positioned within the lower end of the column defined by the depending arms and with each of the radially opening slots 166 registering with and receiving therein one of the straight sections of one of the arms so that all of the arms are rigidly indexed in spaced relationship one to the other in order that the upwardly and outwardly projecting sections 156 thereof, oblique to the axis of the aforereferenced column, are retained in a symmetrical radial pattern in respect to the body portion of the fixture.

In FIG. 32 of the drawings there is shown a further modified form of the fixture hereinbefore described. In this modification a series of arm members generally designated at 168 are formed, preferably from a stiff fiberboard, each arm consisting of an elongated straight flat section 170 having at one end integral juncture with a second elongated flat section 172 which projects at an acute angle from the section 170 to terminate in a plane common to the free extremity of the flat section 170. The section 172 is provided at its extremity and at spaced points along its length with eye formations 174. A plurality of the arms as described is positioned with the straight sections 170 thereof in coincidence one with another in side by side relationship and they are interconnected by means of circular hinge rings 176 located at spaced points therealong, each of which rings penetrates each arm section to form a circular connection upon which the arms may rotate relative to one another.

The foregoing arrangement provides a central column formed by the straight sections 170 of the arms which permits, by means of the pivotal or hinged coupling of the arm sections, the spacing of the arm sections 172 in a symmetrical pattern outwardly from the column. A spacer and indexing element 178, FIG. 33, is utilized to rigidly locate the arm sections 172 in equally spaced radial relationship about the column. The indexing means 178 consists of a circular plate, of fiberboard or the like, having a central opening 180 of sufficient diameter to freely telescope downwardly over the column formed by the straight arm sections and having about its circumference in equally spaced relationship slots 182 opening radially inwardly, there being one slot for each arm of the fixture assembly. The indexing means is telescoped downwardly over the column to bring each slot into registry and engagement with one of the arm sections 172 at a point outwardly from the column and above the lower end thereof to fix the symmetrical relationship of these arm sections which extend upwardly and outwardly oblique to the axis of the column. Ornamental fixtures, not shown, may be then suspended from the several eye formations 174 in each of the arm sections 172 to form an ornamental fixture. The upper ends of the straight sections 170 of the arms may be provided with punched openings 184 to permit the suspension of the arms from an overhead support.

In FIG. 35 of the drawings there is shown a modified form of the fixture closely related to that of FIG. 32 wherein a plurality of fiberboard elements is formed by straight sections 186 and angularly projecting sections 188 substantially identical to arm sections 170 and 172 previously described wherein the upper formerly free extremities of these arms are interconnected by a third straight section 190 forming in essence a triangle having a right angle defined between the first straight section 186 and the horizontally extending third section 190. In this form, adjacent straight sections 186 of adjacent arm elements are hinged together by means of paper or plastic tape 192 which is applied at spaced points along the lengths of these sections by mastic or adhesive to form fibrous hinges between adjacent arm sections whereby the arm elements may be arranged in a symmetrical radial pattern about the central column formed by the adjacent straight sections 186 of the plural arms.

In this particular form the straight sections 186 of each of the arms is projected above its juncture with the third section 190 to provide a stub element 194 over which may be telescopically received a spacing element 196, FIG. 37, which consists of a flat disc having from its axial center a plurality of radially extending slots for the reception of the radially arranged stub sections 194 of the plural arms of the fixture assembly. The spacer member rigidly indexes the arms in a symmetrical radial pattern for the purposes previously described.

In FIG. 38 of the drawings there is shown a modified form of the fixture of FIG. 14 wherein a pedestal base is provided to convert the fixture to a table top rather than a hanging ornament. In this form a post 198 is substituted in place of disc 66 with the top surface 200 of the upper end of the post forming a stop plate for the lower ends of arms 88. A circular stepped base disc 202 is centered beneath the post and an elongated screw 204 is secured upwardly through the disc, post, spacer element (70), indexing disc (72) into the plug 44 in the lower end of tube 42.

At the upper end of tube 42 a crown disc 208 is concentrically seated on the tube end and a finishing cap 210 is screwed down on a stud centrally through the disc to secure the disc in place. Hanging ornaments may be suspended from about the periphery of the crown disc.

By the foregoing arrangement an attractive table top fixture supported by the stepped base disc is provided in lieu of a hanging ornament.

In FIGS. 41–46 there is illustrated a still further embodiment of this invention consisting of an elongated tube 212 provided on its upper end with a co-axially projecting stud section 214 of reduced diameter which is provided with a plurality of transverse passages 216 extending therethrough at spaced points therealong. The lower end of tube 212 is provided with a plug-like head element 218 which consists of a cylindrical section 218a of a greater diameter than tube 212 which is provided with a tapered conical extension 218b extending to terminate in a flush transverse end face 218c. The extreme end of the head 218 is provided with a central bore 220 opening through face 218c to extend inwardly for a distance substantially equal to the length of the head. A circular flange 222 is formed integrally of the head annularly thereabout at the point of juncture of the cylindrical section 218a and the conical extension 218b. A transverse passage 224 extends through the conical extension 218b intermediate its length.

Associated with the tube 212 are discs 226, 228 and 230 similar in all respects to the discs 72, 80 and the crown disc respectively of the fixture of FIG. 14. The disc 226 telescopes over the tube 212 to seat on the shoulder defined at the top end of section 218a of the head element, disc 228 is tightly telescoped over tube 212 and positioned at a spaced distance above the head 218, and the crown disc 230 seats over the stud 214 on the shoulder defined by the stud and tube 212. The discs 226 and 228 position arms 232, like arms 88 of FIG. 14, and also provide hanging support for decorative articles such as are illustrated in other forms of the fixture earlier described.

As seen in FIG. 42 a base standard 234 is associated with the fixture of FIG. 41 to support the fixture on a floor or table surface. The base standard consists of an integrally formed base plate 236 and central post member 238 which is tubular in form. The upper open end of the tubular post section of the base is provided with a downwardly and inwardly tapered conical seat 240 which registers with and supports the conical extension 218b of the head element 218 with the flange 222 on the head seating on the top face of the post. Thus, a fixture of the type disclosed in FIG. 41 may be vertically supported on and above a flat surface.

As is seen in FIG. 43 the stud 214 on the upper end of tube 212 is so dimensioned as to register with and be telescopically received in the bore 220 of the head of a second fixture tube 212 superimposed upon the first. A pin may be secured through aligned passages 224 and 216 in the head and stud respectively to securely interlock the two fixtures. By the same general arrangement, passages 216 in the stud 214 of one fixture may be used to engage a hanging element to suspend the fixture from an overhead support, and the passage 224 in the head 218 of the fixture may be used to support a central decoration below the tube. Further, a series of like fixtures may be suspended one below the other from an overhead support in the same manner as they are supported one above another on a base standard as described.

Having thus described and explained my inventive concepts in detail and having disclosed modifications, combinations and sub-combinations falling within the broad concepts of my invention, what I desire to claim is:

1. A knock-down utility fixture comprising, a body component, a plurality of elongated arm members detachably connected to said body component, portions of said arm members projecting in oblique relationship to said body component, spacing means detachably engaging said arm members intermediate their lengths and rigidly indexing said arms in selected spaced relationship one with another, and means on said arm members for attachment of articles thereto for suspension therefrom.

2. A fixture as defined in claim 1 wherein said body component is provided with means for attachment to a fixed overhead support.

3. A knock-down ornamental fixture comprising, a body member consisting of a block and a cap telescopically receiving said block, arm members detachably coupled to said block and retained thereon by said cap, said arm members each consisting of divergent sections, and indexing means detachably engaging and fixing the relationship of like sections of said plural arm members.

4. A knock-down ornamental fixture comprising, an elongated central component, a plurality of arm members detachably coupled to one end of said central component and extending obliquely to the axis thereof in radially spaced relationship thereabout, indexing means coupled to said central component intermediate the length thereof, and said indexing means detachably engaging intermediate portions of each divergently extending arm to fix the same in spaced relationship.

5. A knock-down ornamental fixture comprising, a plurality of V-shaped rigid arm elements, complementary sections of said arms being arranged in a vertical column to locate the divergent sections in radial projection from the base of the column, hinge means interconnecting each arm section in said column with the adjacent arm sections, and an indexing member concentrically about said column having detachable connection with each of the divergent arm sections about the column.

6. An ornamental fixture comprising, an elongated tube, a conical head on one end of said tube having a central bore opening thereinto, a plurality of arms coupled to said tube adjacent to and radially spaced about the conical head and extending obliquely to the tube axis, indexing means on said tube engaging said arms intermediate the lengths thereof, and a stud of the same diameter as the bore of the conical head extending coaxially from the second end of said tube.

7. An ornamental fixture comprising in combination, an elongated tube, a conical head on one end of said tube, a plurality of rigid arms secured to the tube adjacent the head to extend obliquely to the tube in radially spaced relationship thereabout; and, a base standard having a top opening bore, and said base bore being conical and receiving in registry therewith and supporting the conical head on said tube.

8. A knock-down display fixture comprising, a central body component, a plurality of elongated arms supported from said body component and having like portions thereof extending obliquely to said body component in radially spaced relationship thereabout, and spacer means engaging said arms intermediate their lengths rigidly indexing them in their radially spaced relationship.

9. A knock-down ornamental fixture comprising, a plurality of V-shaped rigid arm elements, complementary sections of said arms being arranged in a vertical column to locate the second sections in divergent radial projection from the base of said column, and spacer means concentrically of said column engaging and rigidly indexing said arms in their spaced relationship.

10. A knock-down ornamental fixture comprising, a central body component, a plurality of elongated arms supported from said body component and having like portions thereof extending obliquely to said body component in radially spaced relationship thereabout, spacing means detachably engaging said arm members intermediate their lengths and rigidly indexing said arms in selected spaced relationship to one another, and means on said arm members for attachment of articles thereto for suspension therefrom.

11. An ornamental fixture as defined in claim 10 wherein said body component is provided with means for attachment to a fixed overhead support.

12. An ornament display stand comprising, a base, a tubular element supported in and extending vertically above said base, a plurality of rigid arms each consisting of a series of angularly offset sections, like ends of said arms detachably connected to said base in radially spaced relationship thereabout locating said arms in divergently extending relationship to said tubular element, indexing means on said tubular element detachably engaging said arms intermediate the lengths thereof, and means spaced along the lengths of said arms for suspending ornaments therefrom.

13. A knock-down ornament fixture comprising, a body member consisting of a block and cap telescopically receiving said block, arm members detachably coupled to said block in radially spaced relationship thereabout and retained by said cap, each arm member consisting of a series of offset linear sections, indexing means detachably engaging corresponding linear sections of said arms intermediate the lengths thereof, and means spaced along the length of each arm for suspending ornaments therefrom.

References Cited in the file of this patent

UNITED STATES PATENTS

| | | |
|---|---|---|
| 290,489 | Simpson | Dec. 18, 1883 |
| 853,762 | Botsford | May 14, 1907 |
| 1,575,168 | Kestell | Mar. 2, 1926 |
| 1,613,386 | Ekdahl | Jan. 4, 1927 |
| 2,593,356 | Smith | Apr. 15, 1952 |
| 2,996,192 | Dell et al. | Aug. 15, 1961 |
| 3,030,720 | Osswald et al. | Apr. 24, 1962 |
| 3,064,379 | Hertzberg | Nov. 20, 1962 |